Patented Apr. 27, 1926.

1,582,668

UNITED STATES PATENT OFFICE.

MAX DREIFUSS, OF BADEN-BADEN, GERMANY.

METHOD OF COATING VESSELS.

No Drawing.   Application filed November 14, 1923. Serial No. 674,758.

*To all whom it may concern:*

Be it known that I, MAX DREIFUSS, a citizen of the German Republic, residing at Baden-Baden, Sofienstr. 17, Germany, have invented certain new and useful Improvements in Methods of Coating Vessels (for which I have filed applications in Germany, July 22, 1922, and September 21, 1922), of which the following is a specification.

The present invention relates to a method of coating vessels with an alloy which is highly resistant to the destructive action of acids, salts and the like, and has particular reference to a method for covering iron vessels on their inside. The alloys hitherto known were either quite insufficient and not resistant enough or on the other hand they dyed the substances dissolved, so that certain salts as for instance chloride of ammonium, could not at all be manufactured in a colorless condition.

The feature of the present invention is to coat the interior surfaces only, in the manufacture of vessels or other articles, so that such vessels or articles are perfectly immune from attacks by acids, salts and the like, and no discoloration of substances in contact therewith is liable to be produced.

Besides the alloy produced according to the present invention has the property that it can be easily cast and welded together with iron. This property renders the alloy in question especially useful for covering the inside of iron vessels being used in the chemical manufacture as boilers. As iron is cheaper and has a greater rigidity than the said alloy, it is not necessary to construct such vessels entirely of the alloy used in connection with the present method as a proportionally thin layer of the alloy proper is sufficient for producing vessels of great volume with relatively small weight but offering great resistance against acids and salts.

An alloy consisting of copper, aluminum and nickel is preferably used in connection with the invention.

A suitable and practical alloy contains 10–11% Al, 6–10% Ni, 2–5% Pb, .5% Fe, 81.5–73% Cu.

Ammonium hydroxide does not destroy such an alloy even at high temperature, which does not occur in any of the alloys hitherto known. Up to now the opinion was predominant that by increasing the amount of nickel in alloys for the present purpose, that is for the evaporation of ammonium chloride, goods results could be obtained, but all tests have shown, that by increasing the amount of nickel over the limits above indicated the chemical resistance against ammonia was diminished.

The alloy is especially suitable for evaporizing the solution of zinc in autoclaves. Besides this the alloy is absolutely resistant to weak sulphate solutions which are nearly saturated, especially to solutions of sulphate of ammonium.

The alloy also has the property that it can very easily be fused or welded to iron, which possibility renders it possible to cut the interior surfaces of iron vessels, such as are commonly used as boilers in chemical manufactures. Thus considerable economy in manufacture is produced since iron is cheaper than the alloy and it is possible instead of making such vessels wholly of the alloy to make them mainly of iron which has the further advantage of producing vessels of greater strength and to form a comparatively little weight which offers great resistance to the destructive action of the acids, salts and the like. When such an alloy is employed in a liquid state for covering the inside of a boiler or if plates or rods of this alloy are to be welded upon iron vessels, an alteration of the alloy by dissolving of iron of the iron vessel takes places. For the purpose of obtaining a quite pure alloy upon the surface of the vessel to be covered several layers of such an alloy are combined one after the other, so that finally the whole surface consists of the alloy or bronze proper.

The manner of covering iron vessels by means of the said alloy can be executed in manifold ways. For instance borax is applied to the carefully cleansed surface and the latter is heated in a reducing flame to a light red state. When the latter state of temperature is attained, small rods or granules of the alloy are brought upon the surface, so that they will melt and alloy them therewith. Upon the layer thus formed a second layer of granules or rods is applied, which layer generally is not altered in composition. But if this is the case and the layer is still influenced by the iron of the vessel, the coating must once more be repeated. By this manner it is possible to completely coat even and curved surfaces, so that on the surfaces only the pure alloy remains.

A further method of coating vessels by means of the present alloys consists therein, that the iron vessel is heated from below into a red hot condition. Afterwards borax is spread upon the glowing surface and the alloy poured out in a liquid state over the red glowing surfaces. After a further heating and further pouring out of the liquid alloy, a layer of the pure alloy is generally formed. Under certain conditions the pouring out must once more be repeated.

It is also possible to dip the iron surface to be coated into the molten alloy, so that by repeated dipping a coating of the alloy proper may be obtained.

Finally it must be mentioned, that the several components of the alloy may be separately applied to the surface to be coated so that the previous combination of the several substances is not necessary for obtaining the desired surface coating of the alloy.

Practical experience has shown that the alloy easily combines with iron so that there is no difficulty, by any of the methods, in coating iron vessels of any shape with a layer which resists the action of acids and the like.

Claim:

A method of coating vessels containing iron which comprises applying a flux to the vessel to be coated, heating the vessel to a red heat in a reducing flame, applying an alloy comprising 10–11% of aluminum, 6–10% nickel, 2–5% of lead, .5% iron, and 81.5–73% copper to the heated surface and thereafter repeatedly heating the vessel and applying successive layers until the surface layer consists of the pure alloy.

In testimony whereof I have affixed my signature.

MAX DREIFUSS.